United States Patent [19]

Koda et al.

[11] 4,306,254
[45] Dec. 15, 1981

[54] MAGNETIC RECORDING DEVICE FOR SYNCHRONIZING HEADWHEEL MOVEMENT

[75] Inventors: Minoru Koda, Hirakata; Yoshiteru Hosokawa, Neyagawa, both of Japan

[73] Assignee: Matsushita Electric Industrial Co., Ltd., Osaka, Japan

[21] Appl. No.: 53,186

[22] Filed: Jun. 28, 1979

Related U.S. Application Data

[63] Continuation of Ser. No. 732,184, Oct. 13, 1976, abandoned.

[30] Foreign Application Priority Data

Oct. 17, 1975 [JP] Japan .................. 50-125737
Oct. 17, 1975 [JP] Japan .................. 50-125739

[51] Int. Cl.³ .................. H04N 5/78; G11B 21/04
[52] U.S. Cl. .................. 360/10; 360/70; 360/75
[58] Field of Search .................. 360/75, 70, 33, 10, 360/11, 35, 76, 77; 318/314

[56] References Cited

U.S. PATENT DOCUMENTS

| | | | |
|---|---|---|---|
| 3,234,325 | 2/1966 | Backers | 360/33 |
| 3,376,383 | 4/1968 | Felix | 360/84 |
| 3,585,291 | 6/1971 | Yamahawa | 360/70 |
| 3,662,099 | 5/1972 | Crosno | 360/75 |
| 3,668,492 | 6/1972 | Konishi | 360/75 |
| 3,742,132 | 6/1973 | Sanguu | 360/70 |
| 3,838,451 | 9/1974 | Mino | 360/10 |
| 3,869,709 | 3/1975 | Yamagishi | 360/10 |
| 3,905,043 | 9/1975 | Frank | 360/77 |
| 3,934,269 | 1/1976 | Fujita | 360/75 |
| 4,001,885 | 1/1977 | Ikushima | 360/70 |
| 4,007,490 | 2/1977 | Shoda | 360/35 |

Primary Examiner—Alan Faber
Attorney, Agent, or Firm—Wenderoth, Lind & Ponack

[57] ABSTRACT

In a magnetic recording and reproducing device for recording a video signal intermittently by a rotary magnetic head, a skewing of the reproduced image can be prevented by controlling the rotation phase of the rotary magnetic head so as to record the horizontal synchronizing signals of the adjacent two tracks so that the phases are conincident, and also a skewing of a reproduced still image can be prevented by controlling the angular velocity of the rotary magnetic head so as to record an integral number of the horizontal synchronizing signals on a scanning trace of the head when the magnetic tape is stopped.

9 Claims, 5 Drawing Figures

MAGNETIC RECORDING DEVICE FOR SYNCHRONIZING HEADWHEEL MOVEMENT

This is a Continuation, of application Ser. No. 732,184 filed Oct. 13, 1979, now abandoned.

BACKGROUND OF THE INVENTION

This invention relates to a magnetic recording and reproducing device, and more particularly to a magnetic recording and reproducing device for recording video signals intermittently on a magnetic tape by rotary heads and reproducing the signals, for example, as a quick motion image or a still image.

Usually, in a magnetic recording and reproducing device for recording a video signal, which is taken out at every n fields (n being an integer), intermittently on a magnetic tape moving at a speed of 1/n of the standard speed, there is sometimes caused distortion (so-called skew) in the reproduced image because the scanning trace of the magnetic head on the magnetic tape becomes different at different tape moving speeds.

Figure 1:
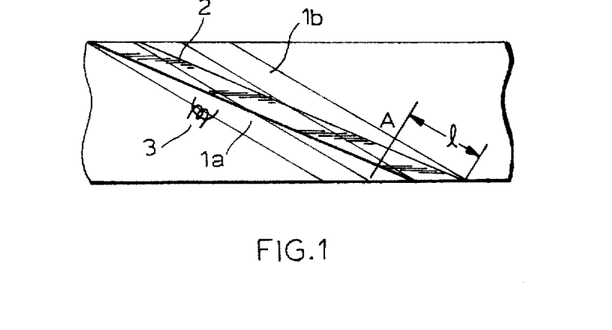
FIGS. 1 and 3 show patterns of a video track on a magnetic tape for explaining the operation of the device of the invention.

For example, referring to FIG. 1, the video signal is recorded as tracks 1a and 1b on a magnetic tape a reduced tape moving speed, and when the video signal is reproduced at the usual tape speed (according to the Standard of E I A J, this speed is 19.05 cm/sec. E I A J is the Electric Industrial Association of Japan), the scanning trace of the magnetic head 3 is as shown at 2. That is, two adjacent tracks are reproduced at the same time during one scanning of the head 3. In this case, if there is no continuity between horizontal synchronizing signals reproduced from the track 1a and successively from the track 1b, the reproduced image is skewed. Therefore, for a standard type video tape recorder according to the standards of E I J A, the number of the horizontal synchronizing signals to be recorded in a length 1 between an intersection A of the track 1b and a line from the start point of the track 1a perpendicular to the adjacent track 1b and the start point of the track 1b, as shown in FIG. 1, is set to be 4.5 H so as to make the horizontal synchronizing signal continuous between the adjacent tracks, and further the vertical synchronizing signal is arranged so as to be at a constant position on the magnetic tape.

However, in such a recording pattern, although there is no problem when signals for an odd field and an even field are alternately recorded so that there are odd and even field signals on adjacent tracks, when recording only the odd field signals or even field signals successively the phase of the horizontal synchronizing signal becomes different. Thus, skewing of the image reproduced at the standard tape speed can be prevented by recording alternately the even field signals and the odd field signals when recording the video signal intermittently. However, such a recording method requires a complex circuit configuration for a video tape recorder employing a plurality of tape moving speeds. That is, the dividing ratio of dividing circuits connected to a gate, which is used for recording the video signal intermittently and which divides the vertical synchronizing signal of the video signal or the rotation phase signal of a rotary head, should all be odd. Therefore, it is necessary to provide parallel dividing circuits connected to the gate corresponding to the number of the tape moving speeds. On the other hand, when only the odd or even field signals are recorded intermittently, the dividing ratio may be even, and so the dividing circuits can be connected in series even for a plurality of the tape moving speeds and the circuit configuration becomes very simple. FIG. 1 is for the case when the intermittently recorded video signal is reproduced at the standard magnetic speed as a quick motion picture, but even when the video signal is reproduced as a still image by stopping the magnetic tape and scanning a single track, there is also caused skewing in the reproduced still image owing to discontinuity of the horizontal synchronizing signal, as described hereinafter.

SUMMARY OF THE INVENTION

Therefore, an object of the present invention is to present a novel and improved magnetic recording and reproducing device for recording a video signal intermittently and reproducing it without skewing.

Another object of the present invention is to provide a novel magnetic recording device for recording the video signal intermittently on a magnetic tape by helical scanning of a rotary head with control of the phases of the horizontal synchronizing signal of the adjacent tracks so that they are coincident with each other so as to reproduce a motion image without skewing.

A further object of the present invention is to provide a novel magnetic recording device for recording the video signal intermittently on a magnetic tape with control of the horizontal synchronizing signals so that an integral number of such signals is recorded on a single track so as to reproduce a still image without skewing thereof.

A further object of the present invention is to provide a magnetic recording device for recording the video signal intermittently with control of reduction of a change of the vertical synchronizing signal of the video signal and the phase of a rotary magnetic head so as to provide a reproduced image without skewing thereof.

These objects are realized by providing a magnetic recording and reproducing device according to the present invention, which comprises a synchronous rotating means for rotating a rotary magnetic head in a constant phase relation with a vertical synchronizing signal of a video signal, which is recorded intermittently at every N fields (N being an integer) by said rotary head, on a magnetic tape moving at a speed of 1/N of the standard speed, a gating means for providing the video signal of about one field at each N fields, and a control means connected to said gating means for changing the phase relation between said rotary head and the vertical synchronizing signal of the video signal or the rotation speed of said rotary head, wherein upon recording the video signal intermittently, said control means controls the rotation phase of said rotary head so as to record the horizontal synchronizing signal with coincident phases on the adjacent tracks, or controls the rotation speed of said rotary head so as to record an integral number of the horizontal synchronizing signals on a track scanned by the head when the tape is stopped.

BRIEF DESCRIPTION OF THE DRAWINGS

These and other objects and the features of the present invention will be apparent from consideration of the following description of a preferred embodiment together with the accompanying drawings in which.

DETAILED DESCRIPTION OF A PREFERRED EMBODIMENT

As described hereinbefore referring to FIG. 1, even when the number of the horizontal synchronizing signals recorded in the length 1 includes a fraction of 0.5 H, H being a horizontal scanning period, that is the distance between two horizontal synchronizing signals on the magnetic track, by recording the odd field and the even field alternately this fraction disappears due to the phase difference of the horizontal synchronizing signals of the adjacent tracks. On the other hand, considering the phase relation between the vertical and horizontal synchronizing signals for the even field and that for the odd field, the phase of the horizontal synchronizing signal for the vertical synchronizing signal for the even field is different by 0.5 H from that for the odd field. Therefore, according to the present invention, when recording only the even field or the odd field on the tape intermittently, the vertical synchronizing signal, which is usually recorded at a constant position on the tape, is recorded while changing the phase by 0.5 H for each alternate track, so that the fraction of 0.5 H of the phase difference representing the horizontal synchronizing signals for the adjacent tracks disappears. In the following, an embodiment of an apparatus for carrying out this method is described in detail.

Figure 2:
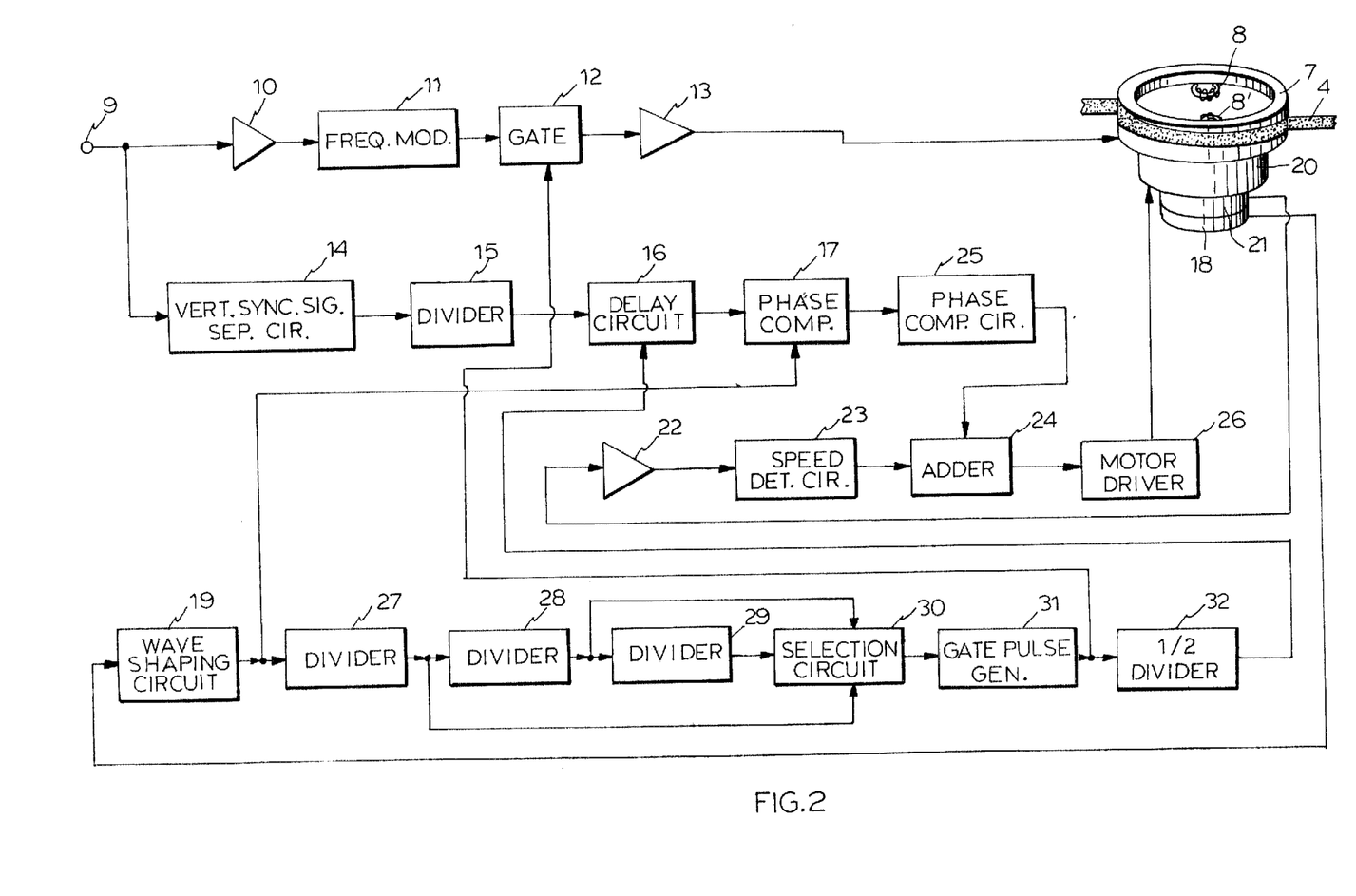
FIG. 2 is a block diagram of an embodiment of a device of the invention.

In FIG. 2, a magnetic tape 4 is wound around about a half the circumference of a drum 7 and moved at an appointed speed by a capstan (not shown) and a pinch roller (not shown). Two magnetic heads 8 and 8' are mounted on the inside of the drum exactly 180° apart.

A video signal applied to an input terminal 9 is amplified by an amplifier 10 and applied to a frequency modulator 11. The output signal of the frequency modulator 11 is gated for a time slightly longer than one field at a gate circuit 12 and applied to a recording amplifier 13. The signal amplified by the amplifier 13 is recorded on the magnetic tape 4 by the magnetic heads 8 and 8' mounted on the drum 7.

The video signal at the input terminal 9 is also applied to a vertical synchronizing signal separating circuit 14 where the vertical synchronizing signal is separated from the video signal. The separated vertical synchronizing signal is converted into pulses of the frame frequency from the field frequency by a dividing circuit 15 and is applied to a delay circuit 16. On the other hand, a rotation phase detector 18 coupled to the rotary heads generates one pulse for each rotation of the rotary heads 8 and 8', and this pulse is applied to a wave-shaping circuit 19. The wave-shaped signal from the wave-shaping circuit 19 is applied to a phase comparator 17, and the phase thereof is compared with that of the pulse from the delay circuit 16.

The rotary heads 8 and 8' are rotated by a motor 20 mounted at the lower portion of the drum 7. A rotation speed detector 21, which is mounted under the motor 20, generates a signal having a frequency corresponding to the speed of rotation of the motor 20, and that signal is amplified by an amplifier 22 and applied to a speed detecting circuit 23, which converts the frequency corresponding to the rotation speed of the motor 20 into a voltage. The output of the speed detecting circuit 23 is applied to an adder 24. On the other hand, the voltage from the phase comparator 17, i.e. the phase difference voltage between the pulses from the wave-shaping circuit 19 and from the delay circuit 16, is also applied to the adder 24 through a phase compensation circuit 25. The output signal of the adder 24 is applied to a motor driver 26, which provides the driving power to the motor 20. Accordingly, the rotary heads 8 and 8' are rotated in a constant phase relation with the vertical synchronizing signal of the video signal applied to the input terminal 9.

The output of the wave-shaping circuit 19 is also applied to a first divider 27, the output of which is applied to a second divider 28. In turn, the output of the divider 28 is applied to a third divider 29. Each of these outputs of the dividers 27, 28 and 29 is also applied to a is manually set to select circuit 30 which selects only the output of a certain one of these dividers 27, 28 and 29 depending on the tape speed being used. The output of the selecting circuit is applied to a gate pulse generator 31 which is composed of e.g. a monostable multivibrator and which generates a pulse for determining the gating time of the gate 12.

As described hereinbefore, in the device of the invention, only the even or odd field is recorded intermittently. For the case when three tape moving speeds are employed such as 1/18, 1/36 and 1/72 of the standard tape speed (19.05 cm/sec), as because the pulses from the wave-shaping circuit 19 are at the same frequency as for the occurrence of each frame, the dividing ratio of the divider 27 is set to be 1/9 and those of the dividers 28 and 29 are set to be ½. When the magnetic tape 4 is moved at the speed of 1/18 of the standard speed, the gate pulse generator 31 is triggered by the pulse from the divider 27 and generates a gate pulse which is slightly longer than one field at an interval of every 9 frames. Then, the gate 12 is opened by this pulse. Therefore, a video signal of about one field is supplied to the respective heads 8 and 8' at intervals of 18 fields and a magnetic track is formed on the tape 4. To carry out the method of recording only even fields, only one of the heads 8 and 8' is used for actual recording.

The gate pulse generator 31 is connected to a ½ divider 32 composed of e.g. a bistable multivibrator which changes its state upon being fed information at the end of the gate pulse from the gate pulse generator 31. Each time the output of the divider 32 becomes a high level and then a low level, the delay circuit 16 connected thereto is actuated to provide a delay and is then deactivated to remove the delay. The delay time for the tracks to be recorded which is provided in accordance with the change of state of the divider 32 is a time of 0.5 H and it is provided just after a track is formed by the head being used for recording, and is removed after the next track is formed by the head. Accordingly, there is provided a phase difference of 0.5 H between the head 8 and the vertical synchronizing signal of the video signal applied to the input terminal 9, every other time the head 8 forms a track. Therefore, the position where the vertical synchronizing signal is recorded on the tape 4 by the head 8 on alternate tracks changes by a length corresponding to 0.5 H.

Figure 2A:
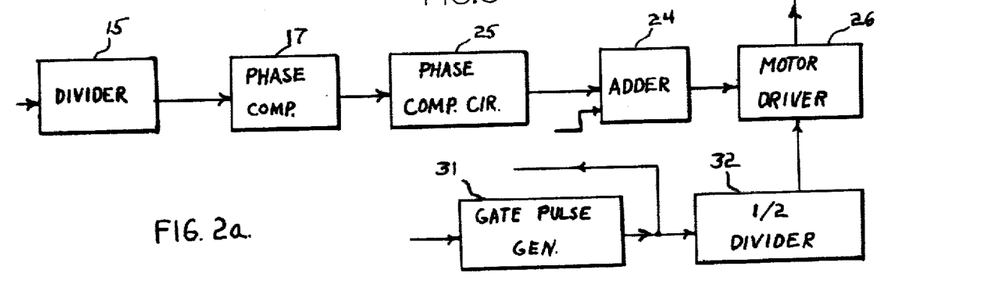
FIG. 2a is a partial block diagram showing a modified embodiment of the device of FIG. 2.

In addition, because the video signal is recorded intermittently, there is a time after one track is formed by the head 8 until a next track is formed, and so the gains of the speed detecting circuit 23, phase comparator 17, motor driver 26, etc. are arranged so as to set the rotation phase of the motor 17 to the appointed phase within this time. The delay time of the delay circuit 16 is changed by using a monostable multivibrator and changing the charge time constant thereof which determines the delay time in response to the output of the divider 32. According to the invention, changing the delay time of the delay circuit 16 is used as a method of changing the rotation phase of the head 8. The presence or absence of the delay time is detected by the phase comparator 17, and the motor 20 is controlled by the voltage through the phase compensation circuit 25. The phase compensation circuit 25 usually includes an integration type filter, and so there is caused a time delay thereat. This time delay can be removed by applying the output of the ½ divider 32 to the motor driver 26 instead of to the delay circuit, and the delay circuit can be omitted, as shown in FIG. 2a. When the magnetic track formed as described hereinbefore is reproduced at the standard tape speed, the skewing of the reproduced image can be prevented, and further there is provided the following advantage. That is, because the position where the vertical synchronizing signal is recorded is different by 0.5 H for adjacent tracks, the video signal reproduced continuously from these tracks has a vertical synchronizing signal the phase of which is different by 0.5 H relative to the phase of the horizontal synchronizing signal for alternate tracks. Therefore, there is provided an interlaced image on a CRT.

Although there has been described hereinbefore the method of making the vertical synchronizing signal recording position for the signal of alternate tracks different by the length of 0.5 H from the signal of the adjacent tracks, it is also possible to apply the invention to a video tape recorder in which even when the odd and even fields are recorded alternately, there is caused a fraction of a phase difference of the horizontal synchronizing signals of the adjacent tracks. In this case, by providing a suitable phase relation between the head 8 and the vertical synchronizing signal, that fraction of the phase difference can be overcome, and so the skewing of the image reproduced at the standard tape speed can be overcome. Further, although there has been described above the case where the heads 8 and 8' scan two tracks, the same result can be provided also for the case when the head scans more than two tracks. The operation of reproducing the thus recorded video signal is performed similarly to a conventional video tape recorder.

Figure 3:
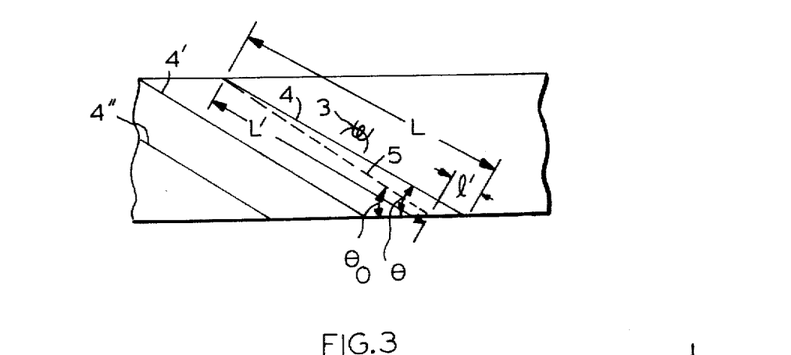

Now, there will be considered the case of reproducing a still image when the magnetic tape is stopped. Referring to FIG. 3 which shows another pattern of the magnetic track, the angle $\theta$ of tracks 4, 4', 4", . . . recorded intermittently by the magnetic head 3 at a tape moving speed slower than the standard tape speed is near an angle $\theta_0$ of a scanning trace 5 of the head 3 when the tape is stopped. In FIG. 3, these tracks are shown by a line, although they have a finite width. However, when the magnetic tape is stopped and a still image is reproduced, because the track angle $\theta$ is slightly different from the scanning angle $\theta_0$, the portion of the video track 4 designated by 1' is not scanned by the head 3 and is thus not reproduced. On the other hand, the number of the horizontal synchronizing signals recorded on the video track 4 is 262.5 H when the standard number of scanning lines for one frame is 525 as in Japan or U.S.A. Therefore, if the number of the horizontal synchronizing signals contained in the portion 1' is a fraction of 0.5 H, the time intervals of the horizontal synchronizing signals repeatedly reproduced by the head 3 as it moves along the scanning trace 5 become equal, and so there is not caused any skewing in the reproduced still image. However, the case when the number of the horizontal synchronizing signals contained in the portion 1' of the track 4 is a fraction of 0.5 H, as described above, exists only for a particular track angle in relation to the standard scanning angle $\theta_0$.

That is, the length L of the video track 4 in FIG. 3 is expressed as follows:

$$L = \left\{ \left(\frac{\pi\phi}{2}\right)^2 + \left(\frac{vt}{f_v}\right)^2 + \frac{vt}{f_v}\pi\phi\cos\theta_o \right\}^{\frac{1}{2}} \quad (1)$$

where $\phi$ is the diameter of the cylinder on which the head 3 is mounted, vt is the moving speed of the magnetic tape, $f_v$ is the field frequency, and $\theta_0$ is the scanning angle of the head 3 when the tape is stopped as described above. According to the tape format of E I J A, the values of these factors are $\phi=115.823$ mm, vt=190.5 mm/sec (in case of the standard speed), $f_v=59.94$ Hz, and $\theta_0=3°11'$, respectively. The length L of the video track 4 is a length for recording the video signal of one field and it contains the horizontal synchronizing signal of 265.5 H. On the other hand, the length L' of the scanning trace of the head 3 when the tape is stopped is represented as follows by inserting vt=0 in the equation:

$$L' = \frac{\pi\phi}{2} \quad (2)$$

Because the angle $\theta_0$ is small, namely 3°11', the length of portion 1' can be approximated as follows from the equations (1) and (2):
$$l' \approx L - L' \ldots \quad (3)$$

The number of the horizontal synchronizing signals contained in a video track of length L is 262.5, as described above, and so a length Lh for recording one horizontal synchronizing signal and the number Nh of the horizontal synchronizing signals contained in the length 1' which is not reproduced are expressed as follows:

$$Lh = \frac{L}{262.5} \quad (4)$$

$$Nh = \frac{l}{Lh} \quad (5)$$

From the equations (1), (2), (3), (4) and (5), there can be derived the following equation:

$$Nh = \frac{262.5\left[\left\{\left(\frac{\pi\phi}{2}\right)^2 + \left(\frac{vt}{f_v}\right)^2 + \frac{vt}{f_v}\pi\phi\cos\theta_o\right\}^{\frac{1}{2}} - \frac{\pi}{2}\phi\right]}{\left\{\left(\frac{\pi\phi}{2}\right)^2 + \left(\frac{vt}{f_v}\right)^2 + \frac{vt}{f_v}\pi\phi\cos\theta_o\right\}^{\frac{1}{2}}} \quad (6)$$

By inserting the values of $\phi$, $f_v$ and $\theta_0$ of the E I A J tape format, a value of vt for providing Nh=0.5 can be calculated to be vt≈22.5 mm/sec. That is, for the standard type video tape recorder, the above described case in which the horizontal synchronizing signal contained in the length of portion 1' has a fraction of 0.5 H occurs only when the tape moving speed is about 1/8.5 of the standard tape speed (190.5/22.5 ≈ 1/8.5). Therefore, for tape moving speeds other than 22.5 mm/sec, skewing is inevitably caused in the reproduced still image. In order to prevent such skewing, the rotation speed of the head for forming the video track when the tape is moved at an appointed speed is changed so as to make the number of the horizontal synchronizing signal contained in the scanning length of the head when the tape is stopped an integral number. This is achieved as follows according to the invention.

Figure 4:
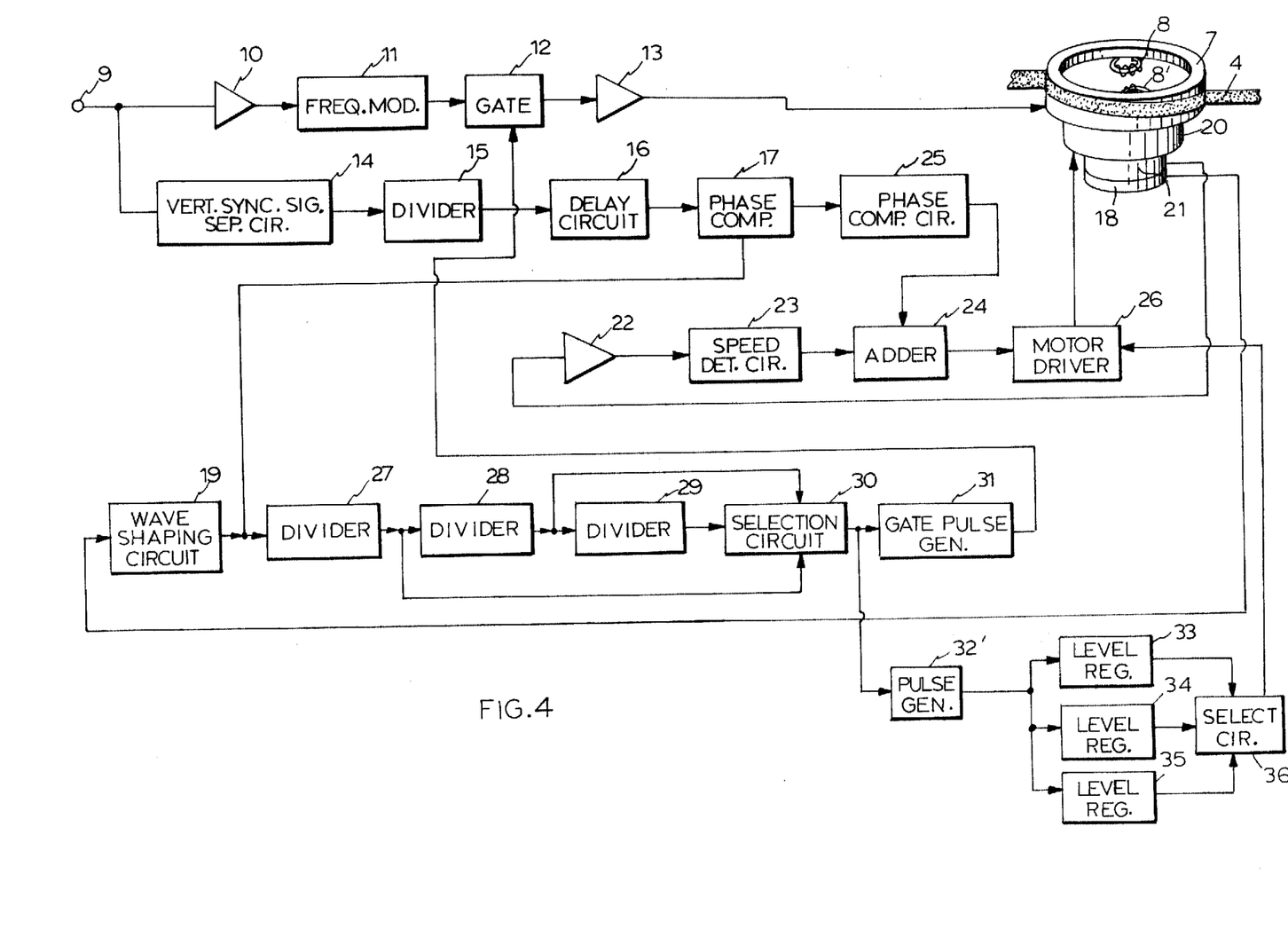
FIG. 4 is a block diagram of another embodiment of a device of the invention.

FIG. 4 is a block diagram of an embodiment of the invention for changing the rotation speed of the head, as described above. It is similar to that of FIG. 2, and the same parts as those of FIG. 2 are designated by the same reference numbers. Because the parts from the input terminal 9 to the gate pulse generator 31 are the same as those of FIG. 2, the description of their operations is omitted. While in FIG. 2, the output from the pulse generator 31 is applied to the gate 12 and also to the delay circuit 16 through the ½ divider 32, as described hereinbefore, in FIG. 4 the output from the pulse generator 31 is applied only to the gate circuit 16 and not to the delay 12, and instead the output from the selection circuit 30 is also applied to a pulse generator 32'. In this case, the delay circuit 16 determines the recording phase during the forming of the video track by the head 8 or 8' so as to locate the recording position of the vertical synchronizing signal of the video signal near the edge of the magnetic tape 4.

The pulse generator 32' generates a pulse for changing the rotation speed of the motor 20 which rotates the heads 8 and 8'. The level of the pulse from the pulse generator 32' is regulated by level regulators 33, 34 and 35, and only a certain one is selected by a selection circuit 36 and connected to the motor driving circuit 26. According to the invention, the pulse width is such as to be near to the period of one field, and the motor is given a polarity so as to be accelerated when a pulse from the level regulator 33, 34 or 35 is applied. Therefore, when a pulse is applied to the motor driving circuit 26 from the level regulator 33, 34 or 35 through the selection circuit 36, the angular velocity of the motor becomes faster while the pulse is being applied. The exchanging operations of the selection circuits 30 and 36 are conjunctive, and the levels of the level regulators 33, 34 and 35 are arranged to cause driving of the tape at speeds so that the head records on the track at a certain moving speed of the tape an integral number of the horizontal synchronizing signals of the video signal to be reproduced, and when the tape is stopped the reproducing head scans the recorded track which has an integral number of horizontal synchronizing signals thereon. That is, for example, when the tape moving speed is arranged to be 1/18, 1/36 and 1/72 of the standard tape speed, by inserting 10.58 mm/sec (≈190.5×1/18), 5.29 mm/sec and 2.65 mm/sec as the values of vt in the equation (6), a value of Nh is obtained as 0.25 H for 1/18 the standard speed, 0.13 H for 1/36 the standard speed, and 0.07 H for 1/72 of the standard speed, respectively. Therefore, the skewing of the reproduced image is the result of the difference between these values and 0.5 H, i.e. 0.25 H for 1/18, 0.37 H for 1/36, and 0.43 H for 1/72, and so the level regulators 33, 34 and 35 are to increase the speed of the motor 20 according to these values so as to prevent the skewing. Similarly, when the tape moving speed is arranged to be 1/12, 1/24 and 1/48 of the standard tape speed, the amount of the horizontal synchronizing signals to be compensated becomes 0.15 H, 0.30 H and 0.4 H, respectively.

Because the video signal is recorded intermittently according to the invention, there is a time until the a next track is formed after one track is formed, and the gains of the speed detecting circuit 23, phase comparator 17, motor driver 26, etc. are arranged, similarly to the case of FIG. 2, so as to set the rotation speed of the motor 17 to the appointed speed within this time. Further, although there has been described hereinbefore the case where the track angle θ for the moving of the tape at the tape moving speed changes to the scanning angle $\theta_0$ when the tape is stopped, the length of the tape, and thus the track angle is slightly changed due to tension applied thereto. Therefore, when there is a change between the tension applied to the tape during moving of the tape at an appointed speed and the tension applied to the tape during scanning when the tape is stopped, skewing is caused in the reproduced image. However, if the amount of such a change is known previously, the level regulators 33, 34 and 35 can be arranged so as to decrease the skewing. The operation of reproducing the thus recorded video signal is similar to the case of reproducing a still image by a conventional video tape recorder.

Furthermore, according to the invention, when the resonance frequency of the phase control system including the motor 20 is low, it is possible to reduce the phase change between the vertical synchronizing signal of the video signal and the head. That is, the phase control system is composed of the D.C. motor 20, speed detecting circuit 23, adder 24, motor driver 26 and phase comparator 17, and the motor 20 has the characteristics of a second-order system. As well known in control engineering, the transmission function G(s) of a second-order system and its step response f(t) are expressed by the following equations (7) and (8), respectively:

$$G(s) = \frac{\omega_n^2}{s^2 + 2\zeta\omega_n s + \omega_n^2} \tag{7}$$

$$f(t) = a \cdot {}^{-1}\left[\frac{\omega_n^2}{s(s^2 + 2\zeta\omega_n s + \omega_n^2)}\right] \tag{8}$$

where $\xi$ is the damping ratio and $\omega_n$ is an undamped natural angular frequency. In case of $\xi < 1$, the equation (8) is expressed as follows:

$$f(t) = 1 - \frac{1}{\sqrt{1-\zeta^2}} \cdot \epsilon^{-\zeta\omega t} \cdot \sin(\omega_n)\sqrt{1-\zeta^2}\, t + \phi \tag{9}$$

$$\phi = \tan \frac{-1\sqrt{1-\zeta^2}}{\zeta}$$

The response for a step input where <1 becomes oscillatory. In this case, a time (so-called response time or peak time) $T_p$ when the response is at a maximum beyond the final value is obtained by differentiating the equation (9) as follows:

$$T_p = \frac{\pi}{\omega_n\sqrt{1-\zeta^2}} \tag{10}$$

The pulse width accelerated by the pulse from the pulse generator 32' in the invention is about the time for one field, as described hereinbefore and this time ($\simeq 16.6$ msec) is sufficiently short compared with the response time of the control system including the motor 20. When the damping factor of the above mentioned phase control system is 0.6 to 0.7, the time t when the angular velocity of the motor accelerated by the pulse from the pulse generator 32' returns nearly to the original state is about $4/\omega_0\sec(t \simeq 4/\omega_0)$ from the equation (10), neglecting the above mentioned time for the pulse width ($\omega_0$ is the resonance frequency of the phase control system).

On the other hand, the resonance frequency of the phase control system including the motor for rotating the heads 8 and 8' in a conventional video tape recorder is arranged to 5 to 8 (rad/sec), because even when the phase comparator 17 is composed of a sample-holding circuit, the sampling frequency can be as low as 30 Hz, the same as the frame frequency, and so considering the phase delay at the phase comparator 17 and the ripple of the sampling period, it is very difficult to make the resonant frequency larger than 5 to 8 rad/sec. Therefore, at in a range where the period T when the pulse is applied from the pulse generator 32' to the motor driver 26, that is the period T of forming the video track by the head 8 or 8', is shorter than the above mentioned recovery time t, the rotation phase of the heads 8 and 8' for the video signal applied to the input terminal 9 changes, and so the recording position of the vertical synchronizing signal on the tape becomes different. According to the invention, the period T in which the change of the recording position of the vertical synchronizing signal can be made minimum is provided.

The value of the amount by which the rotation phase of the heads 8 and 8' changes, as described above, in the range where the track forming period T is shorter than the recovery time t is expressed as follows. When the pulse generated at the pulse generator 32' has a width of Pw and an amplitude of V (volt) and the period of forming the video track is T, a voltage of E=Pw/T V (volt) is applied to the motor driving circuit 26, and the rotation phase of the heads 8 and 8' changes corresponding to the voltage E. That is, the degree of change of the rotation phase of the heads 8 and 8' is proportional to the amplitude V of the pulse applied to the motor driving circuit 26 and inversely proportional to the period for forming the video track. Therefore, by setting the period T so that the amplitude V increases according to the increase of the length of the period T, it becomes possible to reduce the degree of change of the rotation phase of the heads 8 and 8' at the changing of the period T.

This is quantitatively described for the embodiment of the invention, where the resonance frequency of the phase control system $\omega_0$ is 6 rad/sec and the damping factor is about 0.7, and so the recovery time t is about 0.67 sec. When the tape moving speed is arranged, for example, to be 1/12, 1/24 and 1/48 of the standard tape speed (19.05 cm/sec), the period of forming the video track is 0.2, 0.4 and 0.8 sec, respectively. The pulse generator 32' generates a pulse having a pulse width of about 15 msec, and the amplitude of the pulse to be applied to the motor driving circuit 26 is regulated by the level regulators 33, 34 and 35 to be about 1, 2 and 2.7 volts for the speeds of 1/12, 1/24 and 1/48 of the standard tape speed, respectively. In this case, as described hereinbefore, in the range where the period T for forming the video track is shorter than the recovery time t(about 0.67 sec in this embodiment), that is at the tape moving speed of 1/12 and 1/24 of the standard tape speed (19.05 cm/sec), the rotation phase of the heads 8 and 8' changes. For these tape moving speeds, the above described voltages E and E' become as follows:

$$E = \frac{15 \text{ (msec)}}{200 \text{ (msec)}} \times 1 \text{ (volt)} = 0.075 \text{ (volt)}$$

$$E' = \frac{15 \text{ (msec)}}{400 \text{ (msec)}} \times 2 \text{ (volt)} = 0.075 \text{ (volt)}$$

That is, the degree of change of the rotation phase of the head is the same for the tape moving speeds of 1/12 and 1/24 of the standard tape speed.

In case of the tape moving speed of 1/48 of the standard tape speed, because the period T (=0.8 sec) is longer than the recovery time t($\simeq 0.67$ sec), even when the pulse from the pulse generator 32' is applied to the motor driving circuit 26, the rotation phase of the heads 8 and 8' is the same as that before the pulse is applied. If the moment of inertia of the motor 20 is too large so that the above mentioned value (6 rad/sec in this embodiment) of the resonance frequency $\omega_0$ of the phase control system is not provided and so that when the period T (=0.8 sec) even at the tape moving speed of 1/48 of the standard tape speed is shorter than the recovery time t, the voltage E'' is similarly provided as follows:

$$E'' = \frac{15 \text{ (msec)}}{800 \text{ (msec)}} \times 2.7 \text{ (volts)} = 0.05 \text{ (volt)}$$

Therefore, also in this case, the difference from the above mentioned voltages E and E' for the tape moving speed of 1/12 and 1/24 of the standard tape speed becomes small.

Although an embodiment of the invention is described hereinbefore for the case when the number of the horizontal synchronizing signals on one track is 262.5 H, a similar effect can be provided for other cases according to the invention. Also, the standard tape speed of the magnetic tape is not limited to 19.05 cm/sec. Further, although there has been described a method of changing the amplitude of the pulse from the pulse generator 32' with a constant pulse width thereof, it is also possible to use, as a method of accelerating the motor 20 by a desired amount, pulse generators which generate pulses having a pulse width different from each other, instead of the pulse regulators 33, 34 and 35, in order to make the amplitude of the pulse applied therefrom to the motor driving circuit 26 constant.

What is claimed is:

1. A magnetic recording device for intermittently recording a video signal of about one field of every 2 N fields, N being an integer, by a rotary magnetic head on one track of a magnetic tape moving at a speed of 1/(2 N) of a conventional tape speed, said device comprising: a motor coupled to said rotary magnetic head; a first phase control means coupled to said motor for rotating said rotary magnetic head in a constant phase relationship with respect to a vertical synchronizing signal of the video signal; a detecting means having an input terminal coupled to said motor for generating a pulse signal which represents a phase angle of rotation of said rotary magnetic head each time one rotation of said rotation of said rotary magnetic head is completed; a gating means having an input terminal coupled to said detecting means for providing a video signal of only a (2 M+1)TH or (2 M)TH of every 2 N fields from successive fields of a video signal applied to said gating means, M being an integer; and a second phase control means coupled to said gating means and having an output terminal coupled to said first phase control means for changing the phase relationship between said rotary magnetic head and the vertical synchronizing signal of the video signal, by changing, during intermittent recording of the video signal, the rotation phase of said rotary magnetic head for recording the video signals on adjacent tracks on said magnetic tape with the phases of the horizontal synchronizing signals of the video signals being coincident and compensating half or about half the 0.5 H constant difference between the adjacent tracks caused by said first phase control means, whereby the difference in phase of the horizontal synchronizing signals of the video signals to be recorded on a track on said magnetic tape of half or about half the horizontal sync signal period from the signals on an adjacent track is avoided.

2. A magnetic recording device according to claim 1 wherein said gating means comprises a pulse generator for generating a pulse for operating said gating means so as to provide the video signal of about one field of every 2 N fields, and wherein said second phase control means comprises a flip-flop circuit connected to said pulse generator, and a delay circuit coupled to said rotating means and to which said flip-flop circuit is connected for arranging the phase relationship between said rotary magnetic head and the vertical synchronizing signal of the video signal by changing the delay time of said delay circuit by an output signal from said flip-flop circuit.

3. A magnetic recording device according to claim 2 wherein the output level of said flip-flop circuit is changed according to information present at the end of a gate pulse from said pulse generator.

4. A magnetic recording device according to claim 1 wherein said gating means comprises a pulse generator for generating a pulse for operating said gating means so as to provide the video signal of about one field of every N fields, and wherein said second phase control means comprises a flip-flop circuit connected to said pulse generator, and a motor driving circuit and a motor driven thereby for rotating said rotary magnetic head, said flip-flop circuit being connected to said motor driving circuit for changing the phase of the vertical synchronizing signal of the video signal relative to said rotary magnetic head by applying the output signal from said flip-flop circuit to said motor driving circuit to change the drive of said motor.

5. A magnetic recording device for intermittently recording a video signal for about one field per every N fields, N being an integer, by a rotary magnetic head on one track of a magnetic tape moving at a speed of 1/N of a conventional tape speed, said device comprising: a motor coupled to said rotary magnetic head; a phase control means including a speed detecting circuit coupled to said motor for rotating said rotary magnetic head in a constant phase relationship with respect to a vertical synchronizing signal of the video signal; a detecting means having an input terminal coupled to said motor for generating a pulse signal which represents a phase angle of the rotation of said rotary magnetic head each time one rotation of said rotary magnetic head is completed, said detecting means having an output terminal coupled to said phase control means; a gating means having an input terminal coupled to said detecting means for providing a video signal of about one field of every N fields from successive fields of a video signal applied to said gating means, said gating means having a pulse generator for generating a pulse for operating said gating means so as to provide the video signal of about one field of every N fields; a speed control means having an input terminal coupled to said gating means and having an output terminal coupled to said phase control means and having a level regulator for regulating the level of the output pulse of said pulse generator; and a motor driving circuit coupled to said motor for driving said motor and to which said level regulator is coupled for changing the angular velocity of said rotary magnetic head by applying the output pulse from said pulse generator to said motor driving circuit so as to record an integral number of horizontal synchronizing signal on a track on said magnetic tape, whereby the recording of a number of the horizontal synchronizing signals of the video signal on a track on said magnetic tape which is an integer plus a fraction is avoided.

6. A magnetic recording device according to claim 5 wherein said level regulator comprises means for increasing the width of the output pulse of said pulse generator in accordance with increase of the period of said generated pulse.

7. A magnetic recording device according to claim 5 wherein said level regulator comprises means for increasing the amplitude of the output of said pulse generator in accordance with increase of the period of said generated pulse.

8. A magnetic recording device according to claim 5 wherein said pulse generator comprises means for generating a pulse having a polarity for accelerating the angular velocity of said motor when it is applied to said motor driving circuit.

9. In a magnetic recording device for intermittently recording a video signal on one track of a magnetic tape using a rotary magnetic head, the improvement comprising:
   an input terminal for receiving a video signal;
   a frequency modulator operatively connected to said input terminal for producing a frequency modulated output signal having a predetermined relationship with respect to said video signal;
   a vertical sync signal seperator circuit operatively connected to said input terminal for providing a vertical sync signal output from said video signal;
   a first divider means operatively connected to said vertical sync signal seperator circuit for providing a signal corresponding to a frequency divided vertical synchronizing signal;
   a delay circuit operatively connected to said first divider means for time delaying said signal provided by said first divider means;
   a magnetic tape drum rotated by a motor and arranged such that said magnetic tape is wound around a half circumference of said drum;
   a speed detecting means operatively mechanically connected to said drum for providing a signal corresponding to the rotational speed of said drum;
   a speed detector circuit operatively connected to said speed detecting means for providing a processed signal corresponding to the rotational speed of said drum;
   a rotation phase detector operatively mechanically connected to said drum for generating one electrical pulse for each rotation of said drum;
   a wave shaping circuit operatively connected to said rotation phase detector for providing a wave shaped signal corresponding to the output of said rotation phase detector;

a phase comparator means operatively connected to said delay circuit and said wave shaping circuit for providing an output corresponding to the difference in phase between the signal provided by said delay circuit and the signal provided by said wave shaping circuit;

an adder means operatively connected to said speed detector circuit and said phase comparator means for providing an output corresponding to the addition of the signal provided by said phase comparator means and the signal provided by said speed detector circuit;

a motor driver means operatively electrically connected to said motor and operatively connected to said adder means for controlling the rotation of said motor in dependence upon said signal provided by said adder means;

a plurality of additional divider means operatively connected to said wave shaping circuit for providing a plurality of respectively frequency divided signals from said signal provided by said wave shaping circuit;

a selection circuit operatively connected to said plurality of additional divider means for selecting one of said respective outputs of said plurality of additional divider means;

a gate pulse generator operatively connected to said selection circuit for generating gate pulses in dependence upon the signal provided by said selection circuit;

a gate means operatively connected to said frequency modulator and said gate pulse generator for generating a signal corresponding to a gated version of said signal provided by said frequency modulator;

a magnetic head driver means operatively connected to said rotary magnetic head and said gate means for driving said magnetic head with said signal provided by said gate means;

a divider by 2 divider means operatively connected to said gate pulse generator and said delay circuit for controlling said delay circuit with a signal corresponding to said signal provided by said gate pulse generator divided in frequency by 2;

whereby the difference in phase of horizontal synchronizing signals of said video signal to be recorded on said magnetic tape is controlled.

* * * * *